United States Patent [19]
Montesi

[11] 3,749,359
[45] July 31, 1973

[54] VALVE SEAT CONSTRUCTION
[75] Inventor: Robert Paul Montesi, Bradford, Pa.
[73] Assignee: Dresser Industries, Inc., Dallas, Tex.
[22] Filed: Mar. 24, 1971
[21] Appl. No.: 127,621

[52] U.S. Cl. ............................................. 251/306
[51] Int. Cl. ............................................. F16k 1/226
[58] Field of Search ................... 251/288, 305, 306, 251/358, 173

[56] References Cited
UNITED STATES PATENTS
| | | |
|---|---|---|
| 3,511,474 | 5/1970 | Miner .............................. 251/305 |
| 2,907,548 | 10/1959 | Maas et al. ...................... 251/173 X |
| 3,077,331 | 2/1963 | Burtis .............................. 251/173 |
| 3,414,234 | 12/1968 | Henrion .......................... 251/173 |

*Primary Examiner*—Henry T. Klinksiek
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A butterfly valve in which the vane seat is formed of a corrosion resistant stainless steel ring compressedly interlocked axially onto the valve body.

16 Claims, 8 Drawing Figures

PATENTED JUL 31 1973 3,749,359
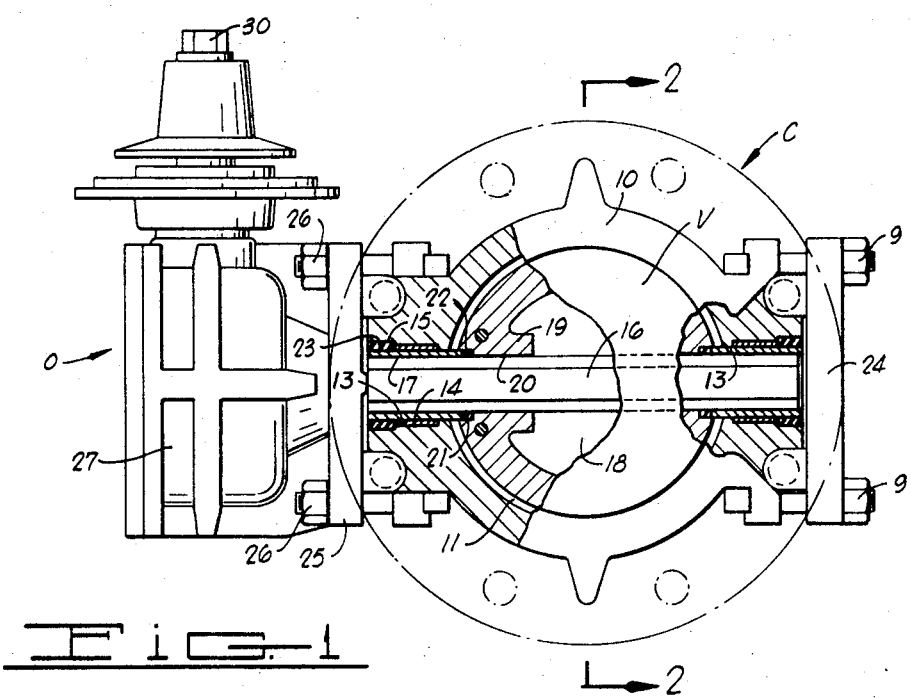
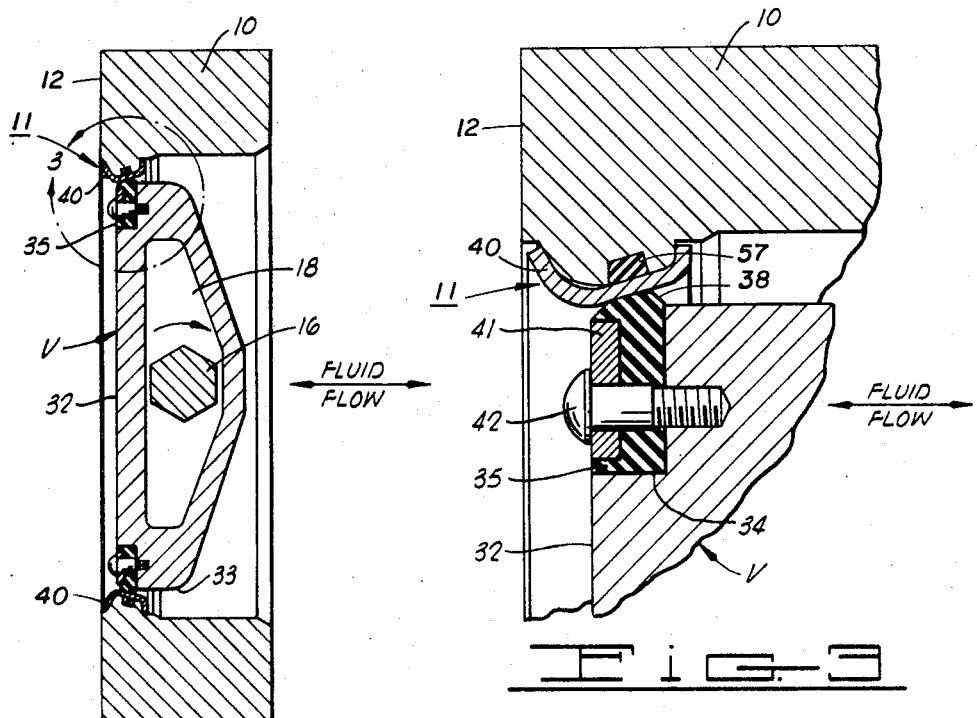
INVENTOR:
ROBERT P. MONTESI
ATTORNEY

VALVE SEAT CONSTRUCTION

CROSS-REFERENCES TO RELATED APPLICATIONS

None

BACKGROUND OF THE INVENTION

1. The field of art to which the invention pertains includes "Valves and Valve actuation" as contained in Patent Office class 251.

2. The prior art to which the invention is directed includes the art of butterfly valves being of a type in which a usually circular vane or disc is rotatable in a fluid body passage between an open and closed position. When in the closed position, the vane engages a seat with which it cooperates to provide a seal against leakage of the pressurized line contents intended to be controlled by the valve. It is desirable if not essential in valves of this type that the seal be effective on each occasion of valve closing for the life of the valve to continuously provide positive shutoff without frequency maintenance and servicing of the seat. Because the seat is commonly subjected to wearing conditions caused by factors such as wire drawing, corrosion, temperature changes, abrasion and the like, it is desirable to provide an ideal seat which is completely unaffected by these environmental factors. Accordingly, it has long been recognized that the seat should comprise a hard, durable corrosion resistant material able to at least substantially retain its machine-finished surface to withstand normal and conventional conditions and provide trouble-free service for very prolonged operating periods. Previous efforts to achieve this result have included the use of premachined alloyed materials for the seat placed into the valve body as a production step subsequent to the casting of the valve body by cementing or the like. This has achieved only a limited success for a short time following manufacture because of the inability of the cement to maintain its bond for the life of the valve. Leakage occurs as the bond, affected by the adverse conditions of use, begins to fall, frequency after only a short time period of operative service. Likewise, various techniques for mechanically attaching a seat ring in a valve body have been utilized as, for example, disclosed in U.S. Pat. Nos. 1,909,478 and 3,511,474. The former is particularly adpated for a reciprocably movable coaxial valve stem in supporting the seat ring on a compressible resilient base while the latter utilizes circumferential cold forging for radially condensing the seat ring material onto a body receiving surface. A technique for cast fusing a body to its seat ring is disclosed in U.S. Pat. No. 3,525,499.

SUMMARY OF THE INVENTION

This invention relates to valves and to the process of their manufacture. More particularly, the invention relates to butterfly valves and the process of producing butrerfly valves in which a valve seat of hard, durable corrosion resistant material is mechanically secured to the valve body in a metal-to-metal axially locked compression interfit therewith. In the manner of the invention, a ring of stainless steel or the like is pre-formed to initially receive an annular support boss or rib integral of the valve body and projecting radially inward of the fluid passage at a predefined axial displacement relative to the turning axis of the closure vane. When in place on the support rib, the ring is axially bent until compressedly interlocked against the rib in a double flanged axially compressed gripping relation therewith. It has been found that not only does this construction afford a concentrically accurate seating surface for the vane with a high order of permanence in protecting the rib support against effects of corrosion, but that it achieves these benefits at substantially reduced fabrication cost as compared to prior art techniqes without condensing the seat metal and without sacrifice in valve quality. Moreover, such seating construction is readily usable with butterfuly valves even when of a "wafer" construction (axially thin stock without end connections) in which placing an annular seat is axially critical and most difficult in view of stock thinness.

It is therefore an object of the invention to provide a novel valve construction having a durable, corrosion resistant seat ring material such as stainless steel mechanically secured to the valve body of cast iron or the like in an economical manner without the attendant special techniques previously required.

It is a still further object of the invention to provide improved butterfly valves having an annular seat ring as in the last mentioned object affording a high defree of permanence in protecting the body seat support against effects of corrosion and the like.

BRIEF DESCRIPTION OF THE DRAWINGS

FIG. 1 is a plan sectional view of a "wafer" type butterfly valve with parts partially broken away;

FIG. 2 is a sectional view taken substantially along the lines 2—2 of FIG. 1;

FIG. 3 is an enlarged view of the vane and seat engagement where encircled in FIG. 2;

Referring now to FIG. 1, there is illustrated a butterfly valve which includes a housing or casing referred to generally by the reference characrer "C." The casing includes an annular body wall 10 preferably of a cast material such as ductile iron or cast iron of A126 or A48 commercial grade. Secured to the body wall is a seat generally designated 11 juxtaposed to radial body end face 12 and formed in accordance with the invention as will be described below. At diametrically opposite points with respect to the seat, the wall 10 includes aligned cylindrical bores 13 sized to accommodate Teflon (trademark) or the like antifriction bearing sleeves 14 and enlarged at their outer ends to provide counterbores 15. The main valve cross-shaft is designated 16 and is of a noncircular formation throughout its length. Carried by the ends of shaft 16 within bores 13 are corrosion resistant bearing sleeves 17, preferably of a corrosion proof material such as stainless steel. Each sleeve has a nonicircular central bore corresponding to the shape of shaft 16 to receive and complement the shaft therethrough as to constitute the driving connection between the shaft and bearing sleeve. The outer sleeve surface is cylindrical and is journaled within Teflon sleeve 14.

Figure 6:
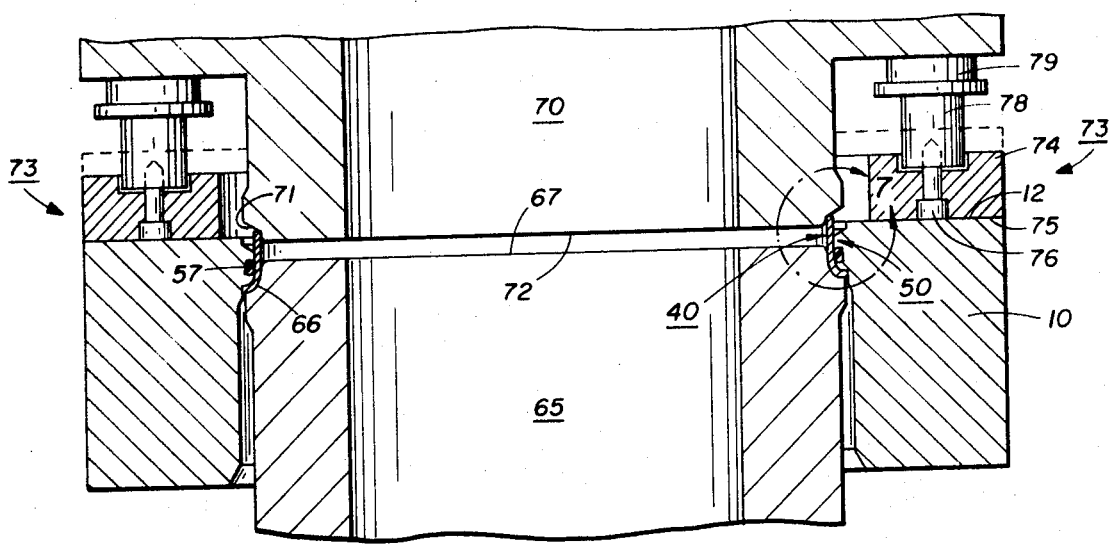
FIG. 6 illustrates apparatus for attaching the seat ring to the valve body in the preferred embodiment.

The vane, as can be seen also in FIG. 2, is referred to in its entirety by the reference character "V." It includes a central cavity 18 through which shaft 16 passes and is formed with opposite internal hubs 19. The hubs in turn are formed with noncircular bores 20 corresponding to the cross section of the shaft 16 received therein to establish a driving connection between the shaft and vane member.

At the outer end of each bore 20, there is included a counter bore 21 partially receiving bearing sleeve 17 and a static seal 22 likewise fitted therein. Positioned in each counter 15 is an outer seal 23, which generally comprises rubber or other suitable elastomeric material, to pervent leakage of fluid from interior of the housing. At one side, seal 23 is held in position by a cover plate 24 secured to the housing by means of bolts 9. The seal 23 on the other side is held in position in a similar manner by a base plate 25 associated with the valve operating mechanism and secured to the housing by bolts 26.

Mounted on base plate 25 is a housing 27 for the valve operating mechanism generally designated as "O." This latter housing defines a chamber in which vane shaft 16 is received through base plate 25 for operatively opening and closing the valve via a wrench engaging member 30 in a manner, as for example, disclosed in U.S. Pat. No. 3,420,500.

The vane and seat construction with which the invention hereof is concerned can be more readily understood with reference to their post-assembly attachment illustrated in FIGS. 2 and 3. As there shown, vane V includes a face 32, a generally circular periphery 33 and a notch-like annular recess 34 at its peripheral corner in which is secured a rubber or other suitable type gasket 35. The gasket has an outer rounded or beveled edge 38 which when the vane is in closed position engages seat ring 40 of seat 11 formed in accordance with the invention hereof. A clamp means in the form of a ring 41 embeds against the backface of the gasket and a screw 42 passes through aligned openings to secure the gasket to the vane. As illustrated in these Figures, the vane is positioned to close the valve against fluid flow. When the vane is rotated through a 90° angular displacement by means of operating mechanism "O," the valve is opened to its maximum flow position.

Figure 4:
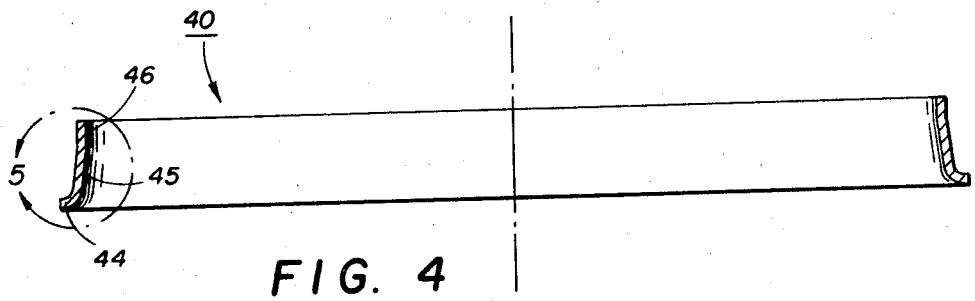
FIG. 4 is a radial section through the seat ring before being attached to the valve body.
Figure 5:
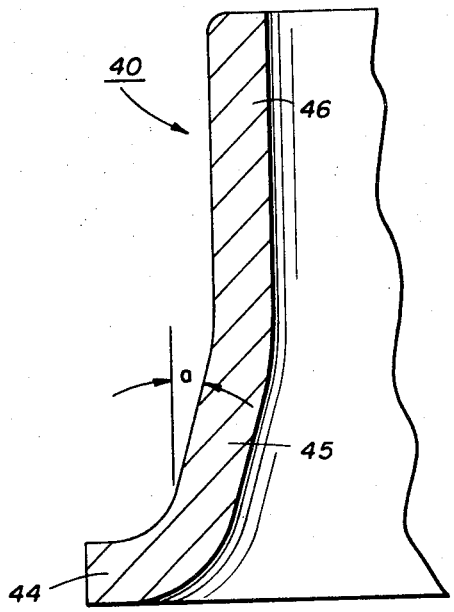
FIG. 5 is a fragmentary enlargement of the encircled shell portion of FIG. 4.

Seat ring 40, as most clearly shown in FIGS. 4 and 5, is in a preferred embodiment a durable, highly corrosion proof stainless steel composition of commercially available grade. Type 304 annealed stainless of about 1/16 inch wall thickness has been found particularly suitable for these purposes and is initially cut from tubular stock after which it is cold rolled to provide an acceptable finish. When initially formed for purposes hereof the ring has a radially extending flange 44 merging with a radially inward sloping axial seating section 45 in turn merging with a bendably deformable axial section 46. The axial offset slope of seating section 45 is represented by the angle alpha and is predetermined to closely match the rotational closure path of vane gasket edge 38. In a commercial embodiment, angle alpha is on the order of about 16°.

Figure 7:
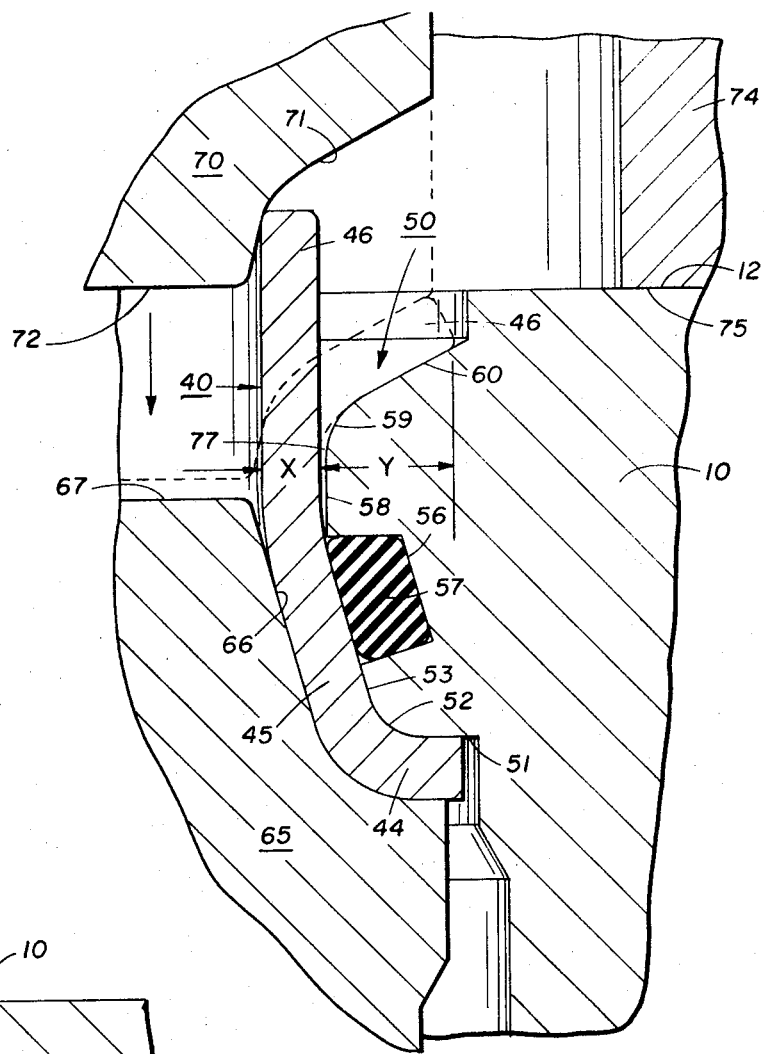
FIG. 7 is a fragmentary enlargement of the encircled portion of FIG. 6.

Attachment of ring 40 to the valve body 10 can best be understood with reference to FIGS. 6 and 7. To receive the ring, body 10 includes an integral radially inward extending seat support in the form of a rib or boss 50 surface-machined prior to ring attachment to a high degree of accuracy with respect to the center line of vane 32. Boss 50 initiates from bottom to top (as viewed in the drawings) in a radial shoulder 51 merging via radius 52 into a radially inward sloping axially extending portion 53 of an angular offset comparable to angle alpha in order to complementarily accommodate the exterior of ring seat portion 45 when applied thereto. Surface 53 terminates with an annular internal recess 56 in which is contained an annular O-ring or other resilient type gasket sealing member 57. From above recess 56 the boss surface comprises an axially extending section 58 connecting via a radius 59 with a radially inward sloping axial surface 60 being on the order of about 60° axial offset.

To secure seat ring 40 to valve body boss 50 there is employed a vertically secured lower die punch 65 annularly recessed at 66 near its top to closely accommodate the interior surface portions 44 and 45 of ring 40. With ring 40 axially in place on surface 66 of die 65, valve body 10 with gasket 57 contained in recess 56 is coaxially placed in a floating relation superimposed onto the ring until body shoulder 51 is in surface engagement against the exterior radial surface of ring flange 44. With the body and ring in place an upper coaxially aligned vertical extending die punch 70 having an annular dished surface 71 generally contoured in geometric correspondence to radius 59 and slope 60 is downwardly advanced toward a forming stroke to engage bendable ring section 46.

Secured coaxially in a surrounding relation to upper die 70 for advancement therewith is a preload member 73 adapted to engage and preload body 10 against lower die 65 before the bending of ring section 46 begins. Preloading to on the order of about 8,000 pounds serves to maintain a firm engagement between the ring and body during the forming step as to preclude any relative slippage therebetween that might otherwise occur. For this purpose member 73 includes a spring pad in the form of an annular ring 74 surrounding the lower end of die 70 and having a forward end face 75 normally dependent in a plane below that of die end face 72. Pad 74 is secured at a plurality of angularly displaced locations via a screw 76 to a piston 78 compressibly received within nitrogen spring assembly 79. By this means pad face 75 engages body face 12 prior to the forming operation as die 70 moves downward toward die 65. Further downward advancement of die 70 causes pad 74 to preload the body and ring until the desired magnitude of preload is achieved. In the latter condition the axial displacement between the die and pad is from the relation illustrated solid to the relation at which the opposite pad face is illustrated dashed.

Thereafter downward movement of die punch 70 is continued until a predetermined forming load is applied as die end face 72 approaches the radial end face 67 of die punch 65. In the course of die movement, ring end 46 is bent radially outward from the position shown solid to the position shown dashed in FIG. 7. Die 70 and its integral preload member 73 are thereafter withdrawn after which body 10 with seat 40 attached to boss 50 is lifted off punch 65 to complete the assembly. The entire attachment step including set up time can be completed in approximately one minute.

In deforming ring 40 for attachment in the manner just described, end 46 is bowed or flared about a clearance 77 into an engagement with boss surface 60 whereby not to condense metal in the process. In the course of deforming an axial grip results between the ring and portions of boss 50. While on removing die 70 a degree of minimal springback is thought to occur between ring end 46 and contiguous boss surface 60, the axial grip is firmly maintained about and radially beyond radii 52 and 59. Thus by this means the bent ring with its structural integrity in tact forms a double flanged axial grip in a metal-to-metal compression interlock with boss 50. The magnitude of formed interlock is sufficient to positively prevent inadvertent rotation of the ring while at the same time avoiding infiltration of line content between the ring and body whereby to preclude corrosive action from occuring therebetween. Moreover, by virtue of the metal-to-metal contact, the likehihood of ring damage from foreign objects apt to become lodged between the ring and vane during operation is extremely minimal. In order to insure the proper magnitude of compressive interlock between ring 40 and boss 50 it has been found that the radial component of bent flange 46 should have a dimension "Y" greater than the ring cross-sectional thickness diminsion "X" on the order of at least 2 to 1.

Figure 8:
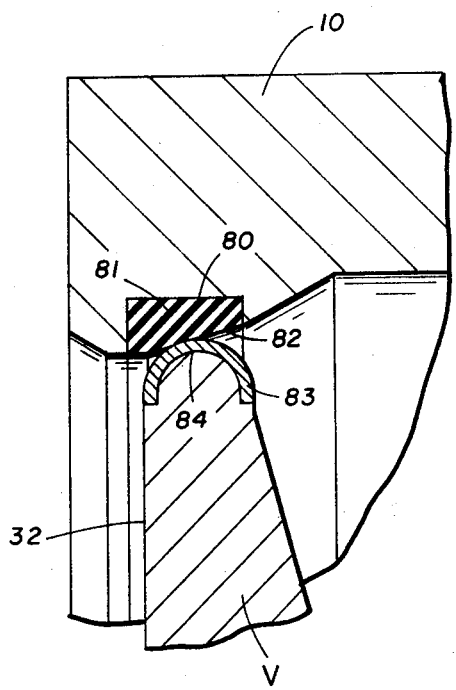
FIG. 8 is an alternative structural embodiment to that of the previous Figs.

Reference is now made to FIG. 8 in which there is disclosed an alternative form of the invention generally not preferred over that disclosed in FIGS. 1–7. In this embodiment, valve body 10, includes an annular recess 80 in which to receive a secured annular resilient gasket material 81. The radial inner gasket surface is sloped at 82 to afford continuity conformance with the flow passage contour thereat and is adapted to be engaged by a corrosion proof type vane tip in the form of a ring 83. The latter ring preferrably corresponds in composition to ring 40 and is bent in an analogous manner onto a more or less semi-circular annular vane boss 84 recessed circumferentially to receive the ring in the manner shown.

By the above description there has been disclosed a novel construction for mechanically securing a seat material of corrosion proof composition onto a valve body such as cast iron in a manner providing a compressive axial interlock therebetween. By virtue of a double flanged formation in a metal-to-metal axially compressive grip formed between the ring and valve body boss provided to support the ring, the assembly can be relatively easily and quickly manufactured to a high degree of permanency and accuracy relative to the vane axis and at comparably less cost than that previously encountered. By the simplicity of this construction therefore, there is economically produced a high quality valve having a suitable corrosion type surface for line content such as water mains or the like. At the same time it is capable of being produced accurately within narrow axial limits such as is demanded in a wafer type valve body.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A butterfly valve comprising in combination:
 a. a body defining a fluid passage between an inlet and outlet;
 b. a vane member supported in said passage and operable between a first position in which said passage is open to fluid flow and a second position in which said passage is closed to fluid flow;
 c. a corrosion resistant metal sealing ring extending exposed in said fluid passage fixedly secured to a metal support on one of said vane member or said body in a compressive metal-to-metal axial grip relation therewith, said secured ring having a cross-sectional thickness substantially retained from when unsecured to said support; and
 d. an annular resilient gasket seal member extending exposed in said fluid passage and secured to the other of to cooperate with said sealing ring vane member or said body, said seal member being adapted to when said vane member is in said second position for effecting shutoff of said passage to fluid flow.

2. A butterfly valve according to claim 1 in which said sealing ring is fixedly secured to the vane member about its circumference and said gasket seal member is secured to said body.

3. A butterfly valve according to claim 1 in which said sealing ring is secured to said body and said gasket seal member is fixedly secured to the vane member about the circumference thereof.

4. A butterfly valve according to claim 3 in which said body includes an integral substantially annular raidally inward extending projection to which said sealing ring is secured.

5. A butterfly valve according to claim 4 in which said projection includes an axially intermediate annular recess and an annular resilient gasket material is contained in said recess compressed in sealing relation underlying against said sealing ring.

6. A butterfly valve according to claim 4 in which said body is of cast iron and said sealing ring is of stainless steel fixedly secured to said projection to comprise the seat for said valve.

7. A butterfly valve according to claim 6 in which at least the surface portion of said seat adapted to cooperate with the gasket seal member on said vane includes an axial offset generally superimposed to the closure path of said vane in moving from said first to said second positions.

8. A butterfly valve according to claim 7 in which said projection includes an axially intermediate annular recess and an annular resilient gasket material is contained in said recess compressed in sealing relation underlying against seat.

9. A butterfly valve according to claim 1 in which said secured ring is of substantially uniform cross-sectional thickness.

10. In a butterfly valve including a metal body defining a fluid passage between an inlet and outlet and a vane member supported in said passage and operable between a first position in which said passage is open to fluid flow and a second position in which said passage is closed to fluid flow, the improvement comprising:
 an annular metal ring of material different than said body and supported on one of said vane or said body for cooperation with a resilient gasket member on the other of said vane or said body when said vane is in said second position, said ring being fixedly secured to its support in a compressive metal-to-metal axial grip relation therewith and having a cross-sectional thickness substantially retained from when unsecured to its support.

11. In a butterfly valve according to claim 10 in which said ring is fixedly secured to said body to comprise the seat of said valve.

12. In a butterfly valve according to claim 11 in which said body includes an annular integral seat support projecting radially inward of said passage at a predetermined location relative to said vane member and to which said seat is fixedly secured.

13. In a butterfly valve according to claim 12 in which said seat is generally double flanged U-shaped in material cross-sectional axially gripping said seat support in compression between said flanges.

14. In a bufferfly valve according to claim 13 in which said seat support includes an axially intermediate annular recess and an annular resilient gasket material is contained in said recess compressed in sealing relation underlying against said seat.

15. In a butterfly valve according to claim 14 in which said body is cast iron and said seat is of stainless steel.

16. In a butterfly valve according to claim 10 in which said secured ring is of substantially uniform cross-section thickness.

* * * * *

PO-1050
(5/69)

UNITED STATES PATENT OFFICE
CERTIFICATE OF CORRECTION

Patent No. 3,749,359        Dated July 31, 1973

Inventor(s) Robert Paul Montesi

It is certified that error appears in the above-identified patent and that said Letters Patent are hereby corrected as shown below:

1. Column 6, line 14, cancel "to cooperate with said sealing ring" and substitute --said--.

2. Column 6, line 16, after "to" insert --cooperate with said sealing ring--.

Signed and sealed this 20th day of November 1973.

(SEAL)
Attest:

EDWARD M. FLETCHER, JR.        RENE D. TEGTMEYER
Attesting Officer        Acting Commissioner of Patents